(12) United States Patent
Foskey et al.

(10) Patent No.: US 10,106,251 B2
(45) Date of Patent: Oct. 23, 2018

(54) VARIABLE ANHEDRAL TIP ROTOR BLADE

(71) Applicant: BELL HELICOPTER TEXTRON INC., Fort Worth, TX (US)

(72) Inventors: Christopher Foskey, Keller, TX (US); Frank B. Stamps, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 1164 days.

(21) Appl. No.: 14/485,967

(22) Filed: Sep. 15, 2014

(65) Prior Publication Data

US 2016/0075430 A1    Mar. 17, 2016

(51) Int. Cl.
*B64C 27/46* (2006.01)
*B64C 27/473* (2006.01)

(52) U.S. Cl.
CPC .......... *B64C 27/463* (2013.01); *B64C 27/473* (2013.01)

(58) Field of Classification Search
CPC ............................ B64C 27/463; B64C 27/473
See application file for complete search history.

(56) References Cited

U.S. PATENT DOCUMENTS

| | | | |
|---|---|---|---|
| 6,394,397 B1* | 5/2002 | Ngo ...................... | B64C 27/463 244/198 |
| 2011/0142642 A1* | 6/2011 | McGrath ................. | F03D 1/065 416/135 |
| 2015/0360773 A1* | 12/2015 | Allen .................... | B64C 27/463 416/1 |

* cited by examiner

*Primary Examiner* — Ryan J Walters
(74) *Attorney, Agent, or Firm* — James E. Walton

(57) ABSTRACT

A rotor blade system includes a rotor blade having an outboard section and an inboard section, a hinge joint rigidly attached to the outboard section, and an adhedral tip engaged with the hinge joint. A method includes pivotally attaching an adhedral tip to the rotor blade and pivoting the adhedral tip during flight to change the flight performance characteristics of the blade during flight.

8 Claims, 5 Drawing Sheets

VARIABLE ANHEDRAL TIP ROTOR BLADE

BACKGROUND

1. Field of the Invention

The present application relates generally to rotor blades, and more specifically, to a rotor blade having an adjustable anhedral rotor tip.

2. Description of Related Art

Rotor blades for helicopters are well known in the art and are necessary to create flight. Conventional helicopters generally use a single static rotor blade having a non-pivoting wing blade tip. In some embodiments, conventional rotor blades incorporate advanced tip shapes and/or anhedral angles, but are fixed in structure.

It should be understood that the conventional static rotor blades are limited in use. For example, the general contouring of the rotor blade are tailored to a specific flight regime and are not optimally tuned outside the designed envelope.

Although the foregoing developments in the field of rotor blades represent great strides, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
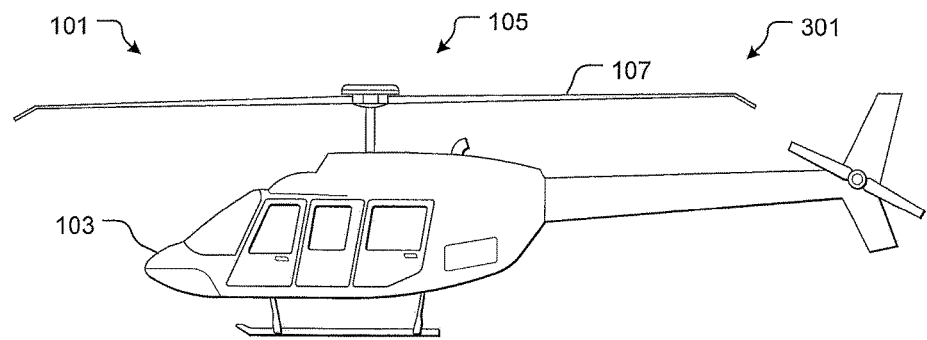
FIG. 1 is a side view of a helicopter according to a preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the apparatus and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system of the present application overcomes the abovementioned problems commonly associated with conventional rotor blades. Specifically, the system of the present application includes an adjustable blade anhedral tip pivotally attached to the rotor blade and configured to pivot at angles 0 through 90 degrees relative to the pressure surface of the rotor blade. Thus, in the contemplated embodiment, the anhedral tip is variable between 0 and 90 degrees, thereby optimizing the flight performance of the blade. Further detailed description of these features are provided below and illustrated in the accompanying drawings.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Referring now to the drawings wherein like reference characters identify corresponding or similar elements throughout the several views, FIG. 1 depicts an aircraft 101 in accordance with a preferred embodiment of the present application. In the exemplary embodiment, aircraft 101 is a helicopter having a fuselage 103 and a rotor system 105 carried thereon. A plurality of rotor blades 107 is operably associated with rotor system 105 for creating flight.

Although shown associated with a helicopter, it will be appreciated that the system of the present application could also be utilized with different types of rotary aircraft and vehicles. For example, FIG. 2 illustrates a tiltrotor aircraft 201 that utilizes the system in accordance with the present application.

Tiltrotor aircraft 201 includes rotor assemblies 213a and 213b that are carried by wings 215a and 215b, and are disposed at end portions 216a and 216b of wings 215a and 215b, respectively. Tilt rotor assemblies 213a and 213b include nacelles 220a and 220b, which carry the engines and transmissions of tilt rotor aircraft 201, as well as, rotor proprotors 219a and 219b on forward ends 221a and 221b of tilt rotor assemblies 213a and 213b, respectively. Tilt rotor assemblies 213a and 213b move or rotate relative to wing members 215a and 215b between a helicopter mode in which tilt rotor assemblies 213a and 213b are tilted upward, such that tilt rotor aircraft 201 flies like a conventional helicopter; and an airplane mode in which tilt rotor assemblies 213a and 213b are tilted forward, such that tilt rotor aircraft 201 flies like a conventional propeller driven aircraft.

Figure 2:
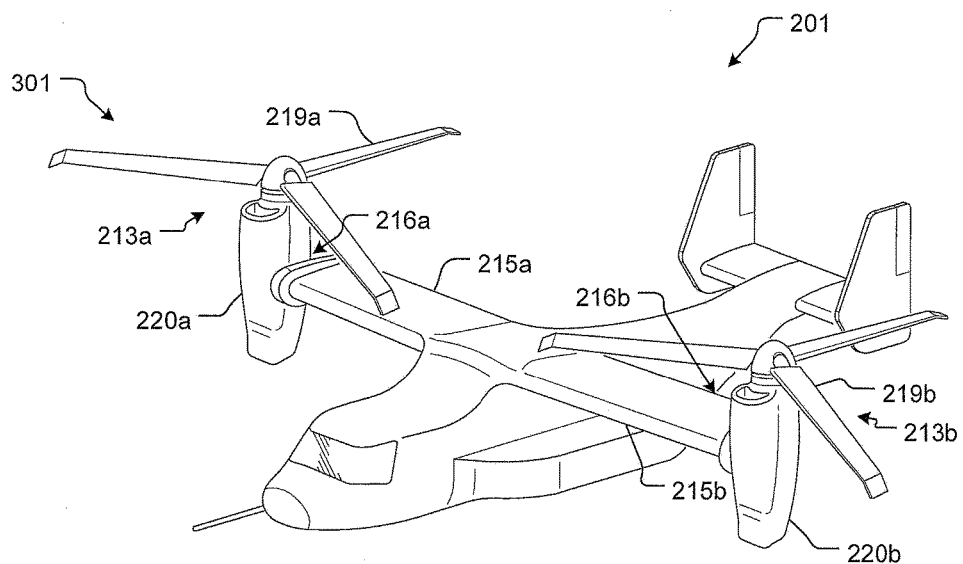
FIG. 2 is a perspective view of a tiltrotor aircraft according to an alternative embodiment of the present application.
Figure 3:
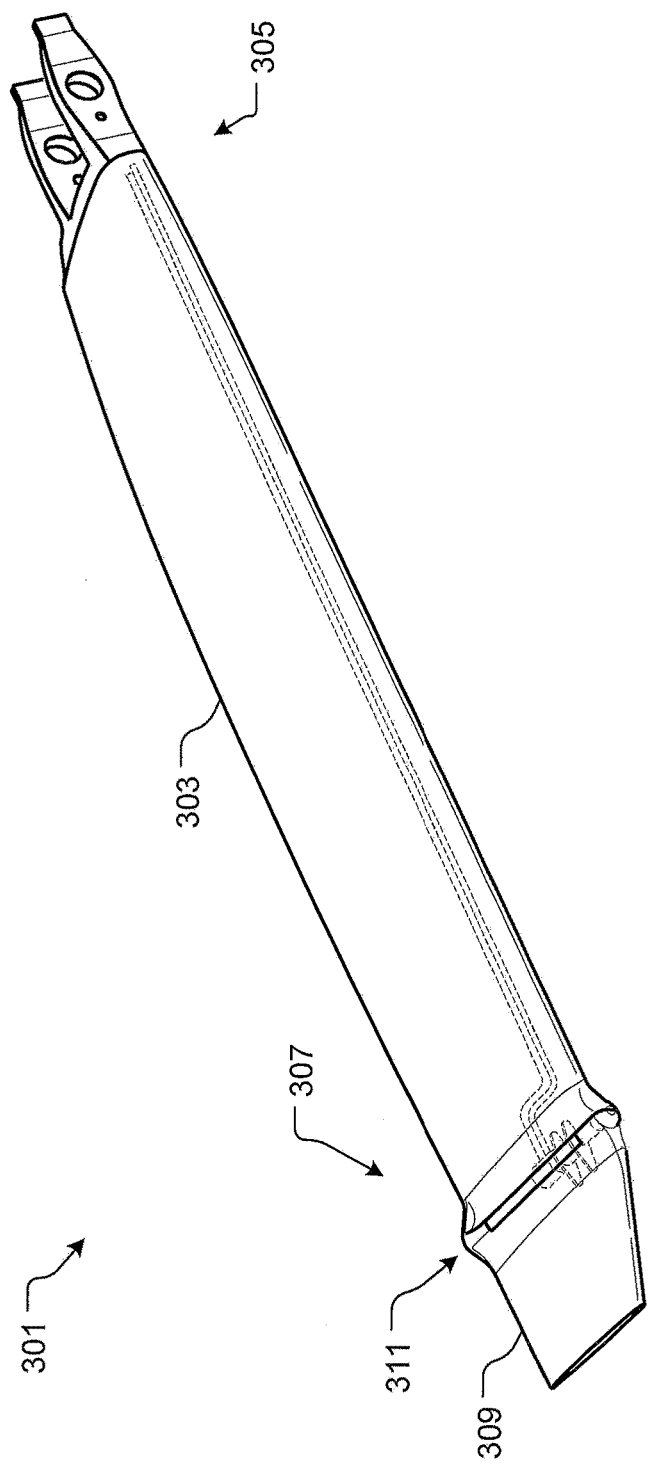
FIG. 3 is a rotor blade system in accordance with a preferred embodiment of the present application.
Figure 4:
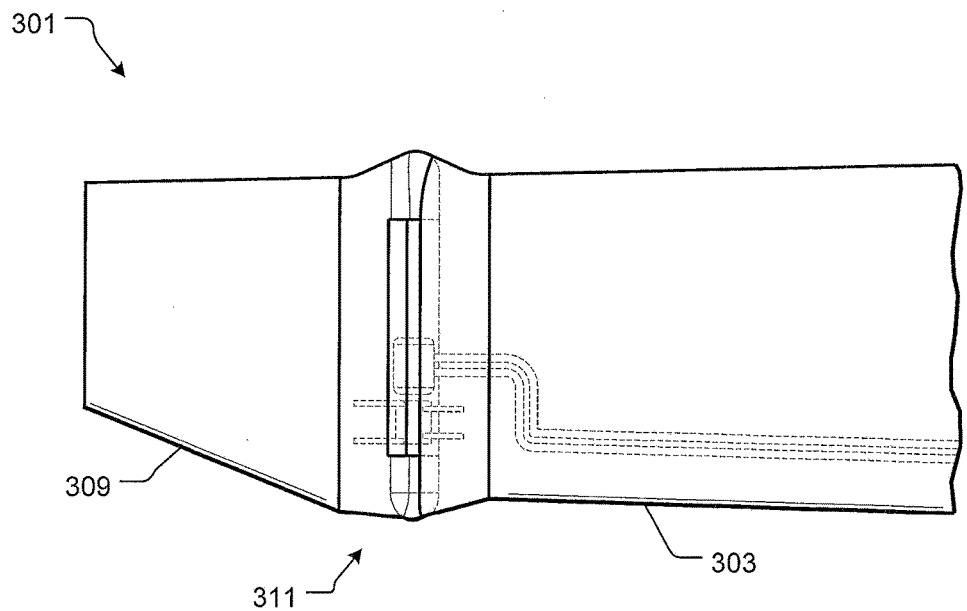
FIG. 4 is a partial top view of the rotor blade system of FIG. 3.

It will be appreciated that the rotor system 301 is utilized with both rotor blades 107 of helicopter 101 and blade 219a of tiltrotor aircraft 201, as depicted in FIGS. 1 and 2.

Referring now to the various view of system 301 shown in FIGS. 3-7, it is contemplated having a rotor system 301 configured to adjust the anhedral tip of the rotor to increase flight performance during various flight condition. Thus, in the contemplated embodiment, these features are achieved via an adjustable anhedral top pivotally attached to the rotor blade. These features are more fully discussed below.

Figure 7:
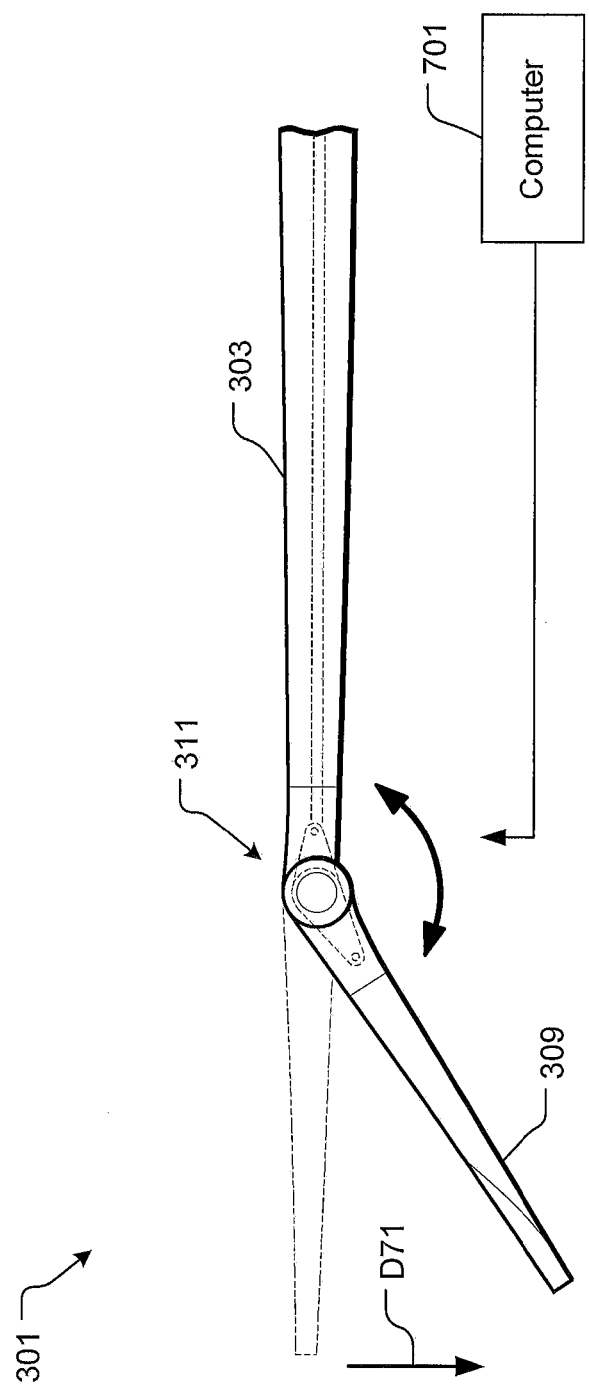
FIG. 7 is a front view of the rotor blade system of FIG. 4.

Blade system 301 includes one or more of a blade 303 having an inboard section 305 and an outboard section 307. One of the unique features believed characteristic of the present application is the use of an anhedral tip 309 pivotally engaged to the outboard section 307 via a hinge joint 311. As depicted in FIG. 7, the hinge joint 311 enables the anhedral tip 309 to move in the direction depicted in direction D71 relative to the span of the rotor blade.

It will be appreciated that the contemplated embodiment is configured to allow pivoting movement of the anhedral tip from 0 to 90 degrees relative to the span or pressure surface of the rotor blade 303. In the preferred embodiment, the anhedral tip pivots solely in the direction relative to the pressure surface of the rotor blade. The pivoting movement of the anhedral tip provides significant advantages as the anhedral tip increases the flight performance of the blade during different flight regimes in various flight conditions. In the contemplated embodiment, the movement of anhedral tip 309 can be autonomously or manually control with a control system 701.

Figure 5:
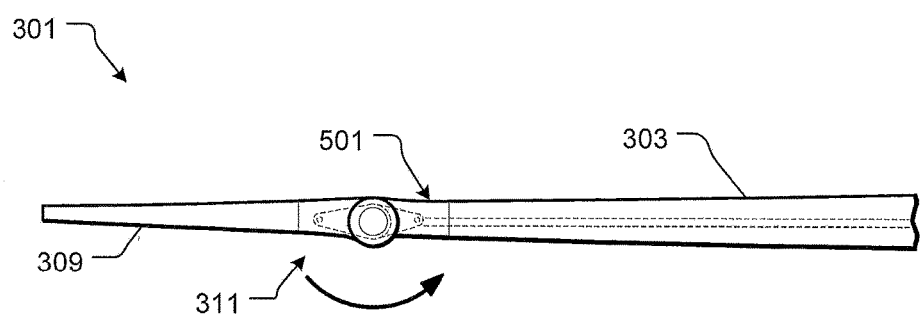
FIG. 5 is a front view of the rotor blade system of FIG. 4.

As depicted in FIG. 5, in the contemplated embodiment, the suction surface 501 is relative linear along between the anhedral tip 309 and blade 303, which in turn increases aerodynamic efficiencies. As shown, the hinge joint 311 is non-linear along the pressure surface of the rotor blade and anhedral tip. This feature is created due to the pivoting movement of the anhedral tip relative to the pressure surface or span of the rotor blade.

Figure 6:
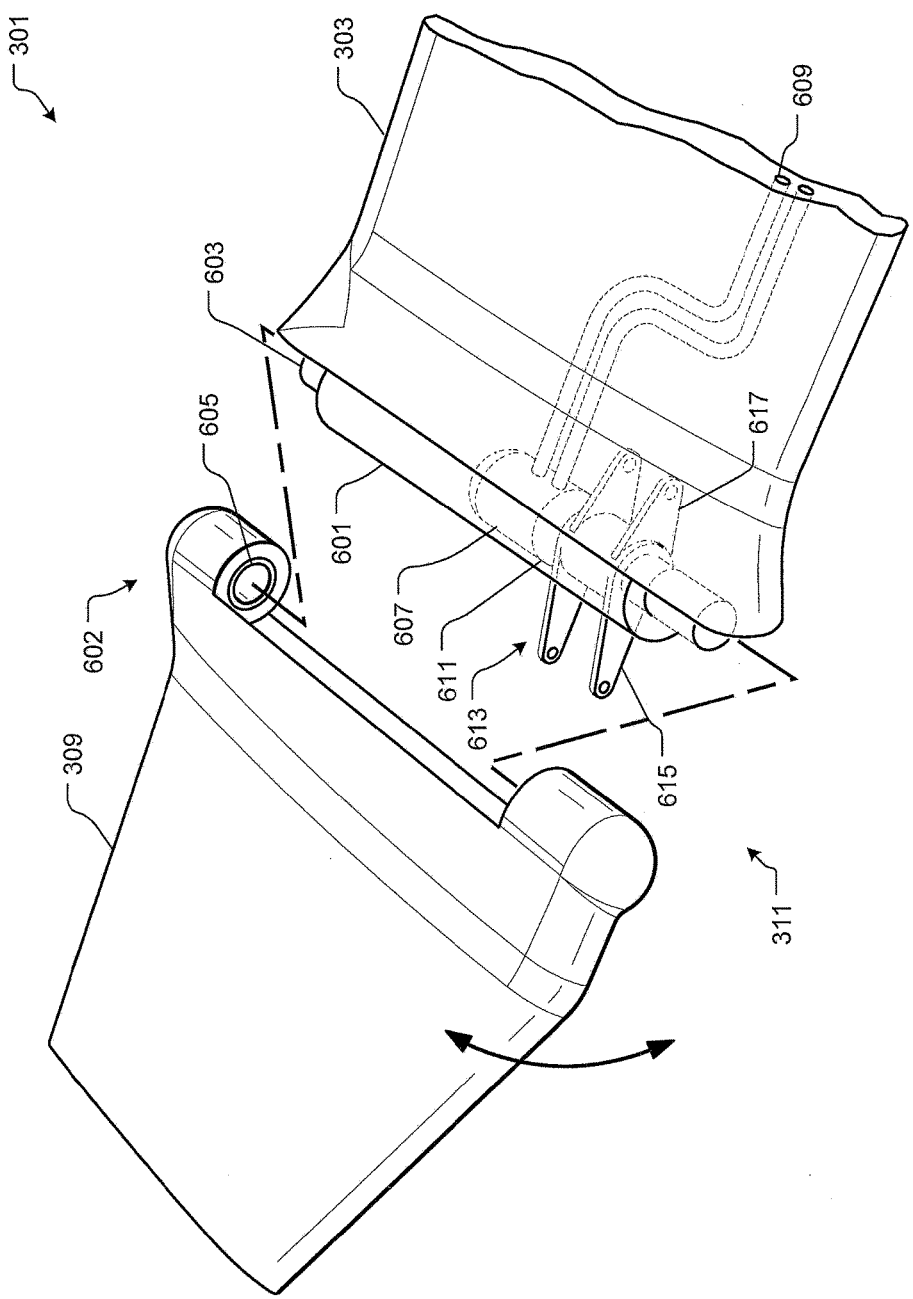
FIG. 6 is an exploded oblique view of the rotor system of FIG. 5.

Referring now to FIG. 6 in the drawings, the various components of hinge joint 311 are depicted. In the preferred embodiment, hinge joint 311 includes a cylindrical housing 601 fixedly attached to the outboard section 307 of blade 303 and is configured to house the various components of hinge joint 311 therein. One or more hinge pins 603 rigidly attach to and extend from housing 601. The hinge pins 603 are configured to engage with one or more bearings 605 attached to an inboard section 602 of anhedral tip 309. Thus, during use, the anhedral tip 309 pivots relative to blade 303 about the hinge pins 603.

Hinge joint 311 is further provided with a power actuator 607 rotatably attached to a transmission 611 and rotary hinge actuator 613. In the preferred embodiment, the power actuator 607 is hydraulically driven via fluid that passes through one or more hydraulic lines 609 extending through the inner area of the blade 303. Although depicted as a hydraulic actuator, it will be appreciate that an electric motor or other actuator could be used in alternative embodiments.

Rotary hinge actuator 613 includes an output arm 615 that engages with the inboard section 602 of anhedral tip 309 and an inboard arm 617 that engages with the outboard section 307 of blade 303.

During use, a hydraulic system (not shown) drives power actuator 607, which in turn rotates the anhedral tip 309 via transmission 611 and actuator 613. The actuation of the anhedral tip there in turn affects the flight performance characteristics of the rotor blade system.

It will be appreciate the variably of the anhedral allows for the rotor to be more efficient in high speed flight which is a regime where a fixed anhedral would be a drag penalty. The anhedral geometry helps control the vortex shed from the blade so it does not impact the next blade in line while hovering. This reduces the power needed to hover, and therefore raises the hover performance by a substantial amount. As mentioned above, the anhedral costs a bit of cruise performance due to higher drag, but this does not outweigh the benefit of the hover performance increase on most applications that use fixed anhedral. The invention of the present application eliminates this drawback and allows both configurations at will.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A rotor blade system, comprising:
   a rotor blade having an outboard section and an inboard section;
   an anhedral tip;
   a hinge joint comprising:
      a cylindrical housing rigidly attached to the outboard section of the rotor blade;
      a hinge pin attached to and extending from the cylindrical housing;
      wherein the hinge pin is configured to engage with a bearing of the anhedral tip; and
      wherein the anhedral tip pivots relative to the hinge pin, the hinge joint rigidly attached to the outboard section; and
   a power actuator disposed within the cylindrical housing and configured to pivot the anhedral tip relative to the blade;
   wherein an the anhedral tip is engaged with the hinge joint; and
   wherein the hinge joint is configured to pivot the anhedral tip relative to blade.

2. The system of claim 1, further comprising:
   a control system configured to autonomously pivot the anhedral tip during flight.

3. The system of claim 1, further comprising:
   a rotary hinge actuator disposed within the housing and rotatably engaged to the power actuator;
   wherein the rotary hinge actuator is configured to engage with the anhedral tip and configured to pivot the anhedral tip relative to the blade.

4. The system of claim 1, the rotary hinge actuator comprising:
   an output arm attached to the anhedral tip; and
   an input arm attached to the rotor blade.

5. The system of claim 1, further comprising:
   a transmission carried within the housing and rotatably attached to and sandwiched between the power actuator and the rotary hinge actuator.

6. The system of claim 1, wherein the power actuator is a hydraulic actuator.

7. The system of claim 6, further comprising:
   a hydraulic line in fluid communication with the hydraulic actuator and configured to extend through the rotor blade.

8. The system of claim 1, wherein the anhedral tip is configured to pivot between a range of 0 to 90 degrees relative to a pressure surface of the rotor blade.

\* \* \* \* \*